(12) United States Patent
Uchida

(10) Patent No.: US 12,552,918 B2
(45) Date of Patent: Feb. 17, 2026

(54) PNEUMATIC TIRE

(71) Applicant: Toyo Tire Corporation, Itami (JP)

(72) Inventor: Ayana Uchida, Itami (JP)

(73) Assignee: TOYO TIRE CORPORATION, Itami (JP)

(*) Notice: Subject to any disclaimer, the term of this patent is extended or adjusted under 35 U.S.C. 154(b) by 605 days.

(21) Appl. No.: 17/979,201

(22) Filed: Nov. 2, 2022

(65) Prior Publication Data

US 2023/0151192 A1 May 18, 2023

(30) Foreign Application Priority Data

Nov. 18, 2021 (JP) .................................. 2021-187806

(51) Int. Cl.
- *C08L 9/00* (2006.01)
- *B60C 1/00* (2006.01)
- *C08L 15/00* (2006.01)

(52) U.S. Cl.
CPC .............. *C08L 9/00* (2013.01); *B60C 1/0016* (2013.01); *B60C 1/0025* (2013.01); *C08L 15/00* (2013.01)

(58) Field of Classification Search
CPC .... C08L 9/00; C08L 15/00; C08L 9/06; C08L 91/00; C08L 57/02; C08L 91/06; B60C 1/0016; B60C 1/0025; B60C 1/00; Y02T 10/86; C08C 19/02; C08C 19/22; C08C 19/25; C08C 19/44; C08F 236/06; C08F 212/08; C08F 236/10; C08F 4/48; C08K 3/36; C08K 5/548; C08K 3/04; C08K 3/22; C08K 5/18; C08K 5/09; C08K 5/47; C08K 5/31; C08K 3/06

See application file for complete search history.

(56) References Cited

U.S. PATENT DOCUMENTS

| | | | | |
|---|---|---|---|---|
| 4,550,147 A | * | 10/1985 | Oohara | C08K 5/098 |
| | | | | 525/348 |
| 2015/0111985 A1 | * | 4/2015 | Tanabe | C08K 3/38 |
| | | | | 523/156 |
| 2019/0256694 A1 | * | 8/2019 | Nakamura | C08L 21/00 |

FOREIGN PATENT DOCUMENTS

| | | |
|---|---|---|
| EP | 0515221 A2 * | 11/1992 |
| JP | 2006-063112 A | 3/2006 |
| JP | 2009-091430 A | 4/2009 |
| JP | 2010-150502 A | 7/2010 |
| JP | 2011-105848 A | 6/2011 |

* cited by examiner

*Primary Examiner* — Doris L Lee
(74) *Attorney, Agent, or Firm* — WHDA, LLP

(57) ABSTRACT

A pneumatic tire includes: a rubber member A containing a rubber component containing 70 mass % to 100 mass % of a hydrogenated copolymer, sulfur, and a triazine-thiol compound; and a rubber member B containing sulfur and a rubber component containing a diene rubber. The hydrogenated copolymer is obtained by hydrogenating an aromatic vinyl-conjugated diene copolymer, has a weight average molecular weight of 300,000 or more as measured by gel permeation chromatography, and has a hydrogenation rate of a conjugated diene moiety of 80 mol % or more, the rubber member A and the rubber member B are in contact with each other at an interface, and a content of the triazine-thiol compound is 0.1 parts by mass to 5 parts by mass with respect to 100 parts by mass of the rubber component in the rubber member A.

7 Claims, No Drawings

PNEUMATIC TIRE

BACKGROUND OF THE INVENTION

1. Field of the Invention

The present invention relates to a pneumatic tire.

2. Description of the Related Art

It is known to use a hydrogenated copolymer as a rubber material having high strength and excellent abrasion resistance. However, the hydrogenated copolymer has hydrogenated double bonds and few crosslinking points, and therefore has poor adhesiveness with other rubber members, and has a problem that defects such as separation between members tend to occur in a tire molding process.

As a method for improving the adhesiveness, JP-A-2011-105848 (Patent Literature 1) describes use of a peroxide, and JP-A-2010-150502 (Patent Literature 2) describes use of a sulfenamide-based vulcanization accelerator having a specific structure. JP-A-2009-91430 (Patent Literature 3) and JP-A-2006-63112 (Patent Literature 4) describe a rubber composition containing a maleimide compound.

However, when the methods described in Patent Literatures 1 to 4 are applied to a rubber composition containing a hydrogenated copolymer, it is necessary to adjust a vulcanization speed, and there is a problem that abrasion resistance of the hydrogenated copolymer is impaired. As a method for improving crosslinking adhesiveness, increasing a sulfur content in the rubber composition containing the hydrogenated copolymer is considered, but the abrasion resistance may be impaired accordingly.

SUMMARY OF THE INVENTION

In view of the above points, an object of the invention is to provide a pneumatic tire having excellent crosslinking adhesiveness between a rubber member containing a hydrogenated copolymer and a rubber member containing a diene rubber while maintaining abrasion resistance of the hydrogenated copolymer.

In order to solve the problems, a pneumatic tire according to the invention includes: a rubber member A containing a rubber component containing 70 mass % to 100 mass % of a hydrogenated copolymer, sulfur, and a triazine-thiol compound; and a rubber member B containing sulfur and a rubber component containing a diene rubber. The hydrogenated copolymer is obtained by hydrogenating an aromatic vinyl-conjugated diene copolymer, has a weight average molecular weight of 300,000 or more as measured by gel permeation chromatography, and has a hydrogenation rate of a conjugated diene moiety of 80 mol % or more, the rubber member A and the rubber member B are in contact with each other at an interface, and a content of the triazine-thiol compound is 0.1 parts by mass to 5 parts by mass with respect to 100 parts by mass of the rubber component in the rubber member A.

A content of the diene rubber contained in the rubber component of the rubber member B may be 70 mass % to 100 mass %.

The rubber member A may further contain a quaternary ammonium salt, a content of the quaternary ammonium salt may be 0.1 parts by mass or more with respect to 100 parts by mass of the rubber component of the rubber member A, and a content ratio between the quaternary ammonium salt and the triazine-thiol compound (quaternary ammonium salt/triazine-thiol compound) may be 0.1 to 2.0.

The triazine-thiol compound may be 1,3,5-triazine-2,4,6-trithiol, and the quaternary ammonium salt may be tetrabutylammonium bromide.

According to the invention, it is possible to obtain a pneumatic tire having excellent crosslinking adhesiveness between a rubber member containing a hydrogenated copolymer and a rubber member containing a diene rubber while maintaining abrasion resistance of the hydrogenated copolymer.

DESCRIPTION OF EMBODIMENTS

Hereinafter, matters related to embodiments of the invention will be described in detail.

[Rubber Member A]

A rubber component of a rubber member A according to the present embodiment contains a hydrogenated copolymer obtained by hydrogenating an aromatic vinyl-conjugated diene copolymer, having a weight average molecular weight of 300,000 or more as measured by gel permeation chromatography, and having a hydrogenation rate of a conjugated diene moiety of 80 mol % or more. Here, in this specification, the "weight average molecular weight as measured by gel permeation chromatography (GPC)" is a value calculated in terms of polystyrene using a differential refractive index detector (RI) as a detector, using tetrahydrofuran (THF) as a solvent, and using commercially available standard polystyrene at a measurement temperature of 40° C., a flow rate of 1.0 mL/min, a concentration of 1.0 g/L, and an injection amount of 40 µL. In addition, the hydrogenation rate is a value calculated based on a spectrum reduction rate of an unsaturated bond moiety in a spectrum obtained by $H^1$-NMR measurement.

An aromatic vinyl constituting the aromatic vinyl-conjugated diene copolymer is not particularly limited, and examples thereof include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used alone or in combination of two or more thereof.

A conjugated diene constituting the aromatic vinyl-conjugated diene copolymer is not particularly limited, and examples thereof include 1,3-butadiene, isoprene, 1,3-pentadiene, 2,3-dimethylbutadiene, 2-phenyl-1,3-butadiene, and 1,3-hexadiene. These may be used alone or in combination of two or more thereof.

The aromatic vinyl-conjugated diene copolymer is not particularly limited, and is preferably a copolymer of styrene and 1,3-butadiene (styrene-butadiene copolymer). Therefore, the hydrogenated copolymer is preferably a hydrogenated styrene-butadiene copolymer. In addition, the hydrogenated copolymer may be a random copolymer, a block copolymer, or an alternating copolymer.

The hydrogenated copolymer can be synthesized, for example, by synthesizing the aromatic vinyl-conjugated diene copolymer and performing a hydrogenation treatment. A method for synthesizing the aromatic vinyl-conjugated diene copolymer is not particularly limited, and examples thereof include a solution polymerization method, a gas phase polymerization method, and a bulk polymerization method. A solution polymerization method is particularly preferred. In addition, a polymerization type may be either a batch type or a continuous type. A commercially available aromatic vinyl-conjugated diene copolymer can also be used.

A hydrogenation method is not particularly limited, and hydrogenation may be performed by a known method under known conditions. Usually, hydrogenation is carried out at 20° C. to 150° C. under a hydrogen pressure of 0.1 MPa to 10 MPa in the presence of a hydrogenation catalyst. The hydrogenation rate can be selected freely by changing an amount of the hydrogenation catalyst, a hydrogen pressure during a hydrogenation reaction, a reaction time, and the like. As the hydrogenation catalyst, a compound containing any one of metals of Groups 4 to 11 in the periodic table can be generally used. For example, a compound containing Ti, V, Co, Ni, Zr, Ru, Rh, Pd, Hf, Re, or Pt atoms can be used as the hydrogenation catalyst. More specific examples of the hydrogenation catalyst include: a metallocene compound containing Ti, Zr, Hf, Co, Ni, Pd, Pt, Ru, Rh, or Re; a supported heterogeneous catalyst in which a metal such as Pd, Ni, Pt, Rh, or Ru is supported on a carrier such as carbon, silica, alumina, or diatomaceous earth; a homogeneous Ziegler catalyst in which an organic salt or an acetylacetone salt of a metallic element such as Ni or Co is combined with a reducing agent such as organic aluminum; an organometallic compound or complex containing Ru or Rh; and a fullerene or carbon nanotube in which hydrogen is occluded.

The hydrogenation rate of the hydrogenated copolymer (ratio of hydrogenation to the conjugated diene moiety in the aromatic vinyl-conjugated diene copolymer) is 80 mol % or more, preferably 80 mol % to 95 mol %, more preferably 85 mol % to 95 mol %, and still more preferably 90 mol % to 95 mol %. When the hydrogenation rate is 80 mol % or more, an effect of improving abrasion resistance by homogenizing crosslinking is excellent.

The weight average molecular weight of the hydrogenated copolymer is not particularly limited as long as it is 300,000 or more, and is preferably 300,000 to 2,000,000, more preferably 300,000 to 1,000,000, and still more preferably 300,000 to 600,000.

The rubber component of the rubber member A may contain a diene rubber other than the hydrogenated copolymer, and examples of the diene rubber include a natural rubber (NR), an isoprene rubber (IR), a butadiene rubber (BR), a styrene-butadiene rubber (SBR), a styrene-isoprene copolymer rubber, a butadiene-isoprene copolymer rubber, and a styrene-isoprene-butadiene copolymer rubber. These diene rubbers may be used alone or in a blend of two or more thereof.

A content ratio of the hydrogenated copolymer in the rubber component is not particularly limited, and is preferably 70 mass % to 100 mass %, and more preferably 80 mass % to 100 mass %.

The rubber member A contains, as vulcanization agent, a sulfur component such as powdered sulfur, precipitated sulfur, colloidal sulfur, insoluble sulfur, and highly dispersible sulfur. A content of the sulfur is not particularly limited, and is preferably 0.5 parts by mass to 4 parts by mass, and more preferably 1 part by mass to 3 part by mass, with respect to 100 parts by mass of the rubber component in the rubber member A. When the sulfur is contained within the above-described range, excellent crosslinking adhesiveness between the rubber member A and the rubber member B can be easily obtained.

The rubber member A contains a triazine-thiol compound, and a content of the triazine-thiol compound is 0.1 parts by mass to 5 parts by mass with respect to 100 parts by mass of the rubber component in the rubber member A. When the content of the triazine-thiol compound is within the above-described range, excellent abrasion resistance and crosslinking adhesiveness can be easily obtained. The triazine-thiol compound may have two or more thiol groups in triazine, and examples of such a compound include 1,3,5-triazine-2,4,6-trithiol, 2-(dibutylamino)-1,3,5-triazine-4,6-dithiol, 6-diallylamino-1,3,5-triazine-2,4-dithiol, 2-amino-4-methoxy-6-(trifluoromethyl)-1,3,5-triazine, 6-(4-vinylbenzyl-n-propyl)amino-1,3,5-triazine-2,4-dithiol, 6-(diisopropylamino)-1,3,5-triazine-2,4-dithiol, 6-(diisobutylamino)-1,3,5-triazine-2,4-dithiol, 6-di(2-ethylhexyl)amino-1,3,5-triazine-2,4-dithiol, 6-(allylamino)-1,3,5-triazine-2,4-dithiol, and 6-(butylamino)-1,3,5-triazine-2,4-dithiol. Among these, 1,3,5-triazine-2,4,6-trithiol is preferred.

The rubber member A may further contain a quaternary ammonium salt. The quaternary ammonium salt is not particularly limited, and examples thereof include tetrabutylammonium bromide, tetrabutylammonium chloride, tetrabutylammonium iodide, benzyltriethylammonium chloride, benzalkonium chloride, didodecyldimethylammonium bromide, dimethylditetradecylammonium bromide, trimethyl-n-octylammonium bromide, tetramethylammonium chloride, trimethyltetradecylammonium chloride, benzyltrimethylammonium dichloroiodate, dodecyltrimethylammonium bromide, and tetramethylammonium iodide. Among these, tetrabutylammonium bromide is preferred.

When the quaternary ammonium salt is contained, a content thereof is preferably 0.1 parts by mass or more with respect to 100 parts by mass of the rubber component in the rubber member A. In addition, a content ratio between the quaternary ammonium salt and the triazine-thiol compound (quaternary ammonium salt/triazine-thiol compound) is not particularly limited, and is preferably 0.1 to 2.0. When the quaternary ammonium salt is contained in the above-described range, excellent abrasion resistance and crosslinking adhesiveness can be easily obtained.

[Rubber Member B]

A rubber component used in a rubber member B according to the present embodiment contains a diene rubber, and a content ratio of the diene rubber in the rubber component is not particularly limited, and is preferably 70 mass % to 100 mass %, and more preferably 80 mass % to 100 mass %.

Examples of the diene rubber include a natural rubber (NR), an isoprene rubber (IR), a butadiene rubber (BR), a styrene-butadiene rubber (SBR), a styrene-isoprene copolymer rubber, a butadiene-isoprene copolymer rubber, and a styrene-isoprene-butadiene copolymer rubber. These diene rubbers may be used alone or in a blend of two or more thereof.

The rubber member B contains, as vulcanization agent, a sulfur component such as powdered sulfur, precipitated sulfur, colloidal sulfur, insoluble sulfur, and highly dispersible sulfur. A content of the sulfur is not particularly limited, and is preferably 0.5 parts by mass to 4 parts by mass, and more preferably 1 part by mass to 3.5 part by mass, with respect to 100 parts by mass of the rubber component in the rubber member B. When the sulfur is contained within the above-described range, excellent crosslinking adhesiveness between the rubber member A and the rubber member B can be easily obtained.

In a pneumatic tire according to the present embodiment, the rubber member A and the rubber member B are in contact with each other at an interface, and the rubber member A contains a predetermined content of the sulfur and the triazine-thiol compound, whereby excellent crosslinking adhesiveness can be obtained. Although this mechanism is not clear, it can be inferred as follows. It can be inferred that, because of having a small double bond amount, the hydrogenated copolymer has few sulfur-mediated crosslinking points at an interface when the rubber member is laminated with other rubber members, but the triazine-thiol compound is contained as the crosslinking points as a crosslinking structure other than sulfur crosslinking, whereby excellent crosslinking adhesiveness can be obtained at the interface between the rubber member A and the rubber member B.

[Other Compounding Chemicals]

In the rubber member A and the rubber member B according to the present embodiment, in addition to the above-described components, compounding chemicals such as a reinforcing filler, a processing aid, zinc oxide, stearic acid, a softener, a plasticizer, a liquid rubber, a resin, a wax, an antiaging agent, and a vulcanization accelerator, which are generally used in the rubber industry, can be appropriately compounded within a normal range. The rubber member A and the rubber member B may have different compounding of these compounding chemicals.

Examples of the reinforcing filler include silica and carbon black, and silica and carbon black may be used in combination. That is, the reinforcing filler may be silica alone, carbon black alone, or a combination of silica and carbon black. The combination of silica and carbon black is preferred. A content of the reinforcing filler is not particularly limited, and is preferably 10 parts by mass to 150 parts by mass, more preferably 20 parts by mass to 100 parts by mass, and still more preferably 30 parts by mass to 80 parts by mass, with respect to 100 parts by mass of the rubber component.

The silica is also not particularly limited, and wet silica such as silica made by a wet-type precipitation method or silica made by a wet-type gel-method is preferably used. A content of the silica is 1 part by mass to 150 parts by mass, and preferably 1 part by mass to 100 parts by mass, with respect to 100 parts by mass of the rubber component.

In addition, a silane coupling agent such as sulfide silane and mercapto silane may be further contained. When a silane coupling agent is contained, a content thereof is preferably 2 mass % to 20 mass % with respect to the content of the silica.

The carbon black is not particularly limited, and various known kinds of products can be used. A content of the carbon black is preferably 1 part by mass to 70 parts by mass, and more preferably 1 part by mass to 30 parts by mass, with respect to 100 parts by mass of the rubber component.

Examples of the vulcanization accelerator include a sulfenamide-based vulcanization accelerator, a guanidine-based vulcanization accelerator, a dithiocarbamate-based vulcanization accelerator, a thiuram-based vulcanization accelerator, a thiazole-based vulcanization accelerator, and a thiourea-based vulcanization accelerator. Among these, the sulfenamide-based vulcanization accelerator, guanidine-based vulcanization accelerator, and dithiocarbamate-based vulcanization accelerators are preferred.

Examples of the sulfenamide-based vulcanization accelerator include N-cyclohexyl-2-benzothiazolylsulfenamide (CZ), N-tert-butyl-2-benzothiazolylsulfenamide (NS), N-oxidiethylene-2-benzothiazolylsulfenamide (MBS), and N,N-diisopropyl-2-benzothiazolesulfenamide (DZ).

Examples of the guanidine-based vulcanization accelerator include 1,3-diphenylguanidine (D) and di-O-tolylguanidine (DT).

Examples of the dithiocarbamate-based vulcanization accelerator include zinc dibenzyldithiocarbamate (ZnBzDTC), zinc dimethyldithiocarbamate (ZnMDC), zinc diethyldithiocarbamate (ZnEDC), zinc di-n-butyldithiocarbamate (ZnBDC), zinc N-pentamethylenedithiocarbamate (ZnPDC), zinc ethylphenyldithiocarbamate (ZnEPDC), sodium dimethyldithiocarbamate (NaMDC), sodium diethyldithiocarbamate (NaEDC), sodium di-n-butyldithiocarbamate (NaBDC), tellurium diethyldithiocarbamate (TeEDC), copper dimethyldithiocarbamate (CuMDC), and iron dimethyldithiocarbamate (FeMDC).

When a sulfenamide-based vulcanization accelerator is contained, a content thereof is not particularly limited, and is preferably 0.1 parts by mass to 3 parts by mass, and more preferably 0.2 parts by mass to 2 parts by mass, with respect to 100 parts by mass of the rubber component.

When a guanidine-based vulcanization accelerator is contained, a content thereof is not particularly limited, and is preferably 0.1 parts by mass to 3 parts by mass, and more preferably 0.2 parts by mass to 2 parts by mass, with respect to 100 parts by mass of the rubber component.

When a dithiocarbamate-based vulcanization accelerator is contained, a content thereof is not particularly limited, and is preferably 0.1 parts by mass to 3 parts by mass, and more preferably 0.2 parts by mass to 2 parts by mass, with respect to 100 parts by mass of the rubber component.

In the rubber member A, it is preferable to use the dithiocarbamate-based vulcanization accelerator and the guanidine-based vulcanization accelerator in combination, and a compounding ratio (guanidine-based vulcanization accelerator/dithiocarbamate-based vulcanization accelerator) is preferably 0.5 to 3.0 in mass ratio.

A total content of the vulcanization accelerator in each rubber member is preferably 0.1 parts by mass to 9 parts by mass, and more preferably 0.5 parts by mass to 6 parts by mass, with respect to 100 parts by mass of the rubber component.

A rubber composition according to the present embodiment can be prepared by kneading according to an ordinary method using a normally used mixing machine such as a Banbury mixer, a kneader, or a roll. That is, in a first mixing stage, additives other than a vulcanization agent and a vulcanization accelerator are added to and mixed with a rubber component, and then in a final mixing stage, the vulcanization agent and the vulcanization accelerator are added to and mixed with an obtained mixture to prepare a rubber composition.

The rubber composition obtained in this way can be used for a tire, and can be applied to various parts of a tire such as a tread and a sidewall of a pneumatic tire having various applications and sizes, such as a tire for a passenger vehicle, or a large-sized tire for a truck or a bus. The rubber composition can be molded into the rubber member A and the rubber member B having a predetermined shape by an ordinary method, for example, extrusion processing, combined with other parts, and then subjected to vulcanization molding at, for example, 140° C. to 180° C. to produce a pneumatic tire.

Application portions are not particularly limited as long as the rubber member A and the rubber member B are in contact with each other at an interface. For example, in a tread including a base rubber disposed at a tire radially outer side of a belt layer and a cap rubber disposed at a tire radially outer side of the base rubber, the rubber member A may be used as the cap rubber, and the rubber member B may be used as the base rubber. In a tread in which different rubber members are disposed in a width direction, the rubber member A may be on the inside (inner side of a vehicle when a tire is mounted), and the rubber member B may be on the outside (outer side of the vehicle when the tire is mounted), or the rubber member A may be on the outside and the rubber member B may be on the inside. In addition, the application portion of the rubber member A may be a tread, and the application portion of the rubber member B may be a shoulder, a side, or a belt layer.

A type of the pneumatic tire according to the present embodiment is not particularly limited, and examples thereof include various types of tires such as a tire for a passenger vehicle, and a heavy-duty tire for a truck or a bus.

EXAMPLES

Hereinafter, Examples of the invention will be illustrated, but the invention is not limited to these Examples.

SYNTHESIS EXAMPLE OF HYDROGENATED COPOLYMER 1

Into a heat-resistant reaction vessel subjected to nitrogen substitution, 2.5 L of cyclohexane, 50 g of tetrahydrofuran (THF), 0.12 g of n-butyllithium, 100 g of styrene, and 400 g of 1,3-butadiene were charged, and polymerized at a reaction temperature of 50° C. After the polymerization was completed, 1.7 g of N,N-bis(trimethylsilyl)aminopropylmethyldiethoxysilane was added and allowed to react for 1 hour, then hydrogen gas was supplied at a pressure of 0.4 MPa-gauge, and the mixture was stirred for 20 minutes. Next, the hydrogen gas supply pressure was set to 0.7 MPa-gauge, the reaction temperature was set to 90° C., and a catalyst mainly composed of titanocene dichloride was used to react until a target hydrogenation rate was reached. The solvent was removed to obtain a hydrogenated copolymer 1.

A weight average molecular weight of the obtained hydrogenated copolymer 1 was measured using "LC-10A" manufactured by Shimadzu Corporation as a measuring device, "PLgel-MIXED-C" manufactured by Polymer Laboratories Ltd. as a column, a differential refractive index detector (RI) as a detector, and THF as a solvent, under a measurement temperature of 40° C., a flow rate of 1.0 mL/min, a concentration of 1.0 g/L, and an injection amount of 40 µL, and was 350,000 in terms of polystyrene based on standard polystyrene. A bound styrene content was 20 mass %, and a hydrogenation rate of a butadiene moiety was 90 mol %. The bound styrene content was obtained based on a spectrum intensity ratio between protons based on a styrene unit and protons based on a butadiene unit (including the hydrogenated moiety) using $H^1$-NMR.

EXAMPLES AND COMPARATIVE EXAMPLES

According to compounding A and B (part by mass) shown in Tables 1 and 2 below, using a Banbury mixer, first, in a first mixing stage (non-productive kneading step), components other than a vulcanization accelerator, sulfur, and a triazine-thiol compound were added and mixed (discharge temperature=160° C.), and then in a final mixing stage (productive kneading step), the vulcanization accelerator, the sulfur, and the triazine-thiol compound were added to and mixed with the obtained mixture (discharge temperature=90° C.) to prepare a rubber composition.

Details of each component in Table 1 are as follows.
Hydrogenated SBR 1: hydrogenated copolymer 1 prepared according to Synthesis Example 1
Silica: "Ultrasil VN3" manufactured by Evonik Japan Co., Ltd.
Silane coupling agent: "Si69" manufactured by Evonik Japan Co., Ltd.
Carbon black: "SEAST 3" manufactured by Tokai Carbon Co., Ltd.
Aromatic oil: "Process NC140" manufactured by JXTG Energy Corporation
Zinc oxide: "Zinc oxide No. 2" manufactured by Mitsui Mining & Smelting Co., Ltd.
Antiaging agent: "Antigen 6C" manufactured by Sumitomo Chemical Co., Ltd.
Stearic acid: "LUNAC S-20" manufactured by Kao Corporation
Wax: "OZOACE0355" manufactured by NIPPON SEIRO CO., LTD.
Quaternary ammonium salt: "tetrabutylammonium bromide" manufactured by Tokyo Chemical Industry Co., Ltd.
Vulcanization accelerator 1: sulfenamide-based vulcanization accelerator, "SOXINOL CZ" manufactured by Sumitomo Chemical Co., Ltd.
Vulcanization accelerator 2: guanidine-based vulcanization accelerator, "NOCCELER D" manufactured by OUCHI SHINKO CHEMICAL INDUSTRIAL CO., LTD.
Vulcanization accelerator 3: dithiocarbamate-based vulcanization accelerator "SANCELER ZBE" manufactured by SANSHIN CHEMICAL INDUSTRY CO., LTD.
Sulfur: "Fine powdered sulfur" manufactured by Tsurumi Chemical Industry Co., ltd.
Triazine-thiol compound: "1,3,5-triazine-2,4,6-trithiol" manufactured by Tokyo Chemical Industry Co., Ltd.
Details of each component in Table 2 are as follows.
ESBR: "SBR1502" manufactured by JSR Corporation, emulsion polymerization styrene-butadiene rubber, weight average molecular weight=420,000
Modified SSBR: "HPR350" manufactured by JSR Corporation, styrene content: 21 mass %, alkoxy group and amino group terminal modified solution polymerized SBR
Silica: "Ultrasil VN3" manufactured by Evonik Japan Co., Ltd.
Silane coupling agent: "Si69" manufactured by Evonik Japan Co., Ltd.
Carbon black: "SEAST 3" manufactured by Tokai Carbon Co., Ltd.
Aromatic oil: "Process NC140" manufactured by JXTG Energy Corporation
Zinc oxide: "Zinc oxide No. 2" manufactured by Mitsui Mining & Smelting Co., Ltd.
Antiaging agent: "Antigen 6C" manufactured by Sumitomo Chemical Co., Ltd.
Stearic acid: "LUNAC S-20" manufactured by Kao Corporation
Wax: "OZOACE0355" manufactured by NIPPON SEIRO CO., LTD.
Resin: C5/C9 petroleum resin, "Petrotack 90" manufactured by Tosoh Corporation
Vulcanization accelerator 1: sulfenamide-based vulcanization accelerator, "SOXINOL CZ" manufactured by Sumitomo Chemical Co., Ltd.
Vulcanization accelerator 2: guanidine-based vulcanization accelerator, "NOCCELER D" manufactured by OUCHI SHINKO CHEMICAL INDUSTRIAL CO., LTD.
Sulfur: "Fine powdered sulfur" manufactured by Tsurumi Chemical Industry Co., ltd., specific gravity=2

TABLE 1

| | Compounding A | | | | | | | | |
|---|---|---|---|---|---|---|---|---|---|
| | Comparative Example 1 | Comparative Example 2 | Example 1 | Example 2 | Example 3 | Example 4 | Example 5 | Example 6 | Example 7 |
| Hydrogenated SBR | 100 | 100 | 100 | 100 | 100 | 100 | 100 | 100 | 100 |
| Silica | 50 | 50 | 50 | 50 | 50 | 50 | 50 | 50 | 50 |
| Silane coupling agent | 4 | 4 | 4 | 4 | 4 | 4 | 4 | 4 | 4 |
| Carbon black | 5 | 5 | 5 | 5 | 5 | 5 | 5 | 5 | 5 |
| Aromatic oil | 30 | 30 | 30 | 30 | 30 | 30 | 30 | 30 | 30 |
| Zinc oxide | 2.0 | 2.0 | 2.0 | 2.0 | 2.0 | 2.0 | 2.0 | 2.0 | 2.0 |
| Antiaging agent | 2.0 | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 | 2.0 | 2.0 |
| Quaternary ammonium salt | — | — | — | 1.0 | 0.3 | 1.5 | 1.0 | 1.0 | 1.0 |
| Vulcanization accelerator 1 | 0.5 | 0.5 | 0.5 | 0.5 | 0.5 | 0.5 | 0.5 | 0.5 | 0.5 |
| Vulcanization accelerator 2 | 1.0 | 1.0 | 1.0 | 1.0 | 1.0 | 1.0 | 1.0 | 1.0 | 1.0 |
| Vulcanization accelerator 3 | 0.8 | 0.8 | 0.8 | 0.8 | 0.8 | 0.8 | 0.8 | 0.8 | 0.8 |
| Sulfur | 1.6 | 1.6 | 1.6 | 1.6 | 1.6 | 1.6 | 1.6 | 1.6 | 1.6 |
| Triazine-thiol compound | — | 7.0 | 1.0 | 1.0 | 1.0 | 1.0 | 3.0 | 5.0 | 3.0 |
| Quaternary ammonium salt/triazine-thiol compound | — | — | — | 1.00 | 0.30 | 1.50 | 0.33 | 0.20 | 0.33 |
| Crosslinking adhesiveness | B | B | A | A | A | A | A | A | A |
| Abrasion resistance | 100 | 118 | 109 | 111 | 110 | 112 | 115 | 121 | 105 |

TABLE 2

| | Compounding B |
|---|---|
| ESBR | 70 |
| Modified SBR | 30 |
| Silica | 100 |
| Silane coupling agent | 8 |
| Carbon black | 20 |
| Aromatic oil | 40 |
| Zinc oxide | 2.0 |
| Antiaging agent | 2.0 |
| Stearic acid | 2.0 |
| Wax | 2.0 |
| Resin | 10 |
| Vulcanization accelerator 1 | 2.0 |
| Vulcanization accelerator 2 | 2.0 |
| Sulfur | 1.0 |

The abrasion resistance was evaluated for each of the obtained rubber compositions having the compounding A. Further, each of the obtained rubber compositions having the compounding A and the obtained rubber composition having the compounding B were adhered to each other, and were evaluated for the crosslinking adhesiveness using a test piece vulcanized at 160° C. for 30 minutes. Measurement and evaluation methods are as follows, and evaluation results are shown in Table 1.

Abrasion resistance: conforms to JIS K6264. An abrasion loss was measured under conditions of a load of 40 N and a slip ratio of 30% using a Lambourn abrasion tester manufactured by Iwamoto Seisakusho Co., Ltd., and a reciprocal of the measured value was shown by an index obtained by taking a value of Comparative Example 1 as 100. It is shown that a larger index indicates a fewer abrasion loss and more excellent abrasion resistance.

Crosslinking adhesiveness: a rubber sample A having the compounding A and a rubber sample B having the compounding B, which were formed into strips, were overlapped and vulcanized at 160° C. for 30 minutes with a PET film partially sandwiched therebetween to adhere the rubber sample A and the rubber sample B together. After the vulcanization, the non-adhered portions of the rubber sample A and the rubber sample B were gripped by "Autograph DCS500" manufactured by Shimadzu Corporation, and peeled off at a peeling speed of 50 mm/min such that the adhered rubber sample had a T shape. After peeling, when the peeled cross-section showed rubber fracture, the rubber sample A and the rubber sample B were evaluated as "A" as having excellent crosslinking adhesiveness, and when interfacial peeling occurred, the rubber sample A and the rubber sample B were evaluated as "B" as having poor crosslinking adhesiveness.

Results are shown in Table 1. Comparing with Comparative example 1, in Examples 1 to 7, the abrasion resistance and the crosslinking adhesiveness are excellent.

Comparative Example 2 is an example in which the content of the triazine-thiol compound exceeds an upper limit value, and the crosslinking adhesiveness is poor.

The pneumatic tire according to the invention can be used as various types of tires for a passenger vehicle, a light truck, or a bus.

What is claimed is:

1. A pneumatic tire comprising:
a rubber member A containing a rubber component containing 70 mass % to 100 mass % of a hydrogenated copolymer, sulfur, and a triazine-thiol compound; and
a rubber member B containing sulfur and a rubber component containing a diene rubber, wherein
the hydrogenated copolymer is obtained by hydrogenating an aromatic vinyl-conjugated diene copolymer, has a weight average molecular weight of 300,000 or more as measured by gel permeation chromatography, and has a hydrogenation rate of a conjugated diene moiety of 80 mol % or more,
the rubber member A and the rubber member B are in contact with each other at an interface,
the rubber member B is a base rubber of a tread, which is disposed at a tire radially outer side of a belt layer, and the rubber member A is a cap rubber of the tread, which disposed at a tire radially outer side of the base rubber,
a content of the triazine-thiol compound is 0.1 parts by mass to 5 parts by mass with respect to 100 parts by mass of the rubber component in the rubber member A,
the rubber member A further contains a quaternary ammonium salt, and a content of the quaternary ammonium salt is 0.1 parts by mass or more with respect to 100 parts by mass of the rubber component in the rubber member A, and a content ratio between the quaternary ammonium salt and the triazine-thiol compound is 0.20 to 1.50.

2. The pneumatic tire according to claim 1, wherein a content of the diene rubber contained in the rubber component of the rubber member B is 70 mass % to 100 mass %.

3. The pneumatic tire according to claim 1, wherein the rubber member A further contains a guanidine-based vulcanization accelerator and a dithiocarbamate-based vulcanization accelerator.

4. The pneumatic tire according to claim 3, wherein a content ratio between the guanidine-based vulcanization accelerator and dithiocarbamate-based vulcanization accelerator is 0.5 to 3.0 in mass ratio.

5. The pneumatic tire according to claim 1, wherein the triazine-thiol compound is 1,3,5-triazine-2,4,6-trithiol, and the quaternary ammonium salt is tetrabutylammonium bromide.

6. The pneumatic tire according to claim 5, wherein the rubber member A further contains a guanidine-based vulcanization accelerator and a dithiocarbamate-based vulcanization accelerator.

7. The pneumatic tire according to claim 6, wherein a content ratio between the guanidine-based vulcanization accelerator and dithiocarbamate-based vulcanization accelerator is 0.5 to 3.0 in mass ratio.

* * * * *